United States Patent
Rousseau et al.

(10) Patent No.: US 11,177,883 B2
(45) Date of Patent: Nov. 16, 2021

(54) METHOD AND DEVICE FOR TRANSMITTING A CODED LIGHT MESSAGE, IN PARTICULAR FOR PURPOSES OF VERIFYING THE DISPLAY OF A CONTENT BY AN ELECTRONIC SCREEN

(71) Applicant: JCDecaux SA, Neuilly sur Seine (FR)

(72) Inventors: Simon Rousseau, Vanves (FR); Philippe Ebersold, Versailles (FR); Valentin Dessert, Paris (FR)

(73) Assignee: JCDECAUX SA, Neuilly sur Seine (FR)

( * ) Notice: Subject to any disclaimer, the term of this patent is extended or adjusted under 35 U.S.C. 154(b) by 0 days.

(21) Appl. No.: 16/978,487

(22) PCT Filed: Mar. 8, 2019

(86) PCT No.: PCT/FR2019/050523
§ 371 (c)(1),
(2) Date: Sep. 4, 2020

(87) PCT Pub. No.: WO2019/171013
PCT Pub. Date: Sep. 12, 2019

(65) Prior Publication Data
US 2020/0403695 A1    Dec. 24, 2020

(30) Foreign Application Priority Data
Mar. 9, 2018    (FR) .................................... 18 52074

(51) Int. Cl.
*H04B 10/116*    (2013.01)
*H04B 10/114*    (2013.01)
(Continued)

(52) U.S. Cl.
CPC ....... *H04B 10/116* (2013.01); *H04B 10/1141* (2013.01); *H04H 60/48* (2013.01); *H04H 60/59* (2013.01)

(58) Field of Classification Search
CPC .. H04B 10/116; H04B 10/1141; H04H 60/48; H04H 60/59
(Continued)

(56) References Cited

U.S. PATENT DOCUMENTS 8,886,054 B2 * 11/2014 Iizuka .................... H04B 10/11
                                                    398/172
9,020,338 B2 *  4/2015 Walewski ............ H04B 10/114
                                                    398/25
(Continued)

FOREIGN PATENT DOCUMENTS

| JP | 2008027029 A | 2/2008 |
| WO | WO 9724873 A1 | 7/1997 |
| WO | WO 2008136520 A1 | 11/2008 |

OTHER PUBLICATIONS

International Search Report related to Application No. PCT/FR2019/050523 dated May 2, 2019.

*Primary Examiner* — Dalzid E Singh
(74) *Attorney, Agent, or Firm* — von Briesen & Roper, s.c.

(57) ABSTRACT

Method for transmitting a coded light message, comprising:
- a step of the coded message being emitted by a light-emitting device, the coded message being emitted in the form of a series of colors emitted during regular consecutive time intervals, said message being coded by transitions between colors;
- a step of the coded message being received by a light sensor controlled to capture the colors emitted by the light emitter during consecutive time intervals and to
(Continued)

thus determine the color transitions between consecutive time intervals, representative of the coded message.

20 Claims, 8 Drawing Sheets

(51) Int. Cl.
*H04H 60/48* (2008.01)
*H04H 60/59* (2008.01)

(58) Field of Classification Search
USPC .......................................................... 398/172
See application file for complete search history.

(56) References Cited

U.S. PATENT DOCUMENTS

| | | | |
|---|---|---|---|
| 9,042,738 B2* | 5/2015 | Schenk | H04B 10/116 398/172 |
| 2004/0043816 A1 | 3/2004 | Gilton | |
| 2005/0135694 A1* | 6/2005 | Daly | G06T 5/20 382/254 |
| 2012/0155889 A1* | 6/2012 | Kim | H04B 10/116 398/193 |
| 2015/0188631 A1* | 7/2015 | Harbers | H05B 47/19 398/119 |
| 2019/0014250 A1* | 1/2019 | Stout | H04N 5/378 |

* cited by examiner

METHOD AND DEVICE FOR TRANSMITTING A CODED LIGHT MESSAGE, IN PARTICULAR FOR PURPOSES OF VERIFYING THE DISPLAY OF A CONTENT BY AN ELECTRONIC SCREEN

CROSS-REFERENCE TO RELATED APPLICATION

This Application is a 35 USC § 371 US National Stage filing of International Application No. PCT/FR2019/050523 filed on Mar. 8, 2019 and claims priority under the Paris Convention to French Patent Application No. 18 52074 filed on Mar. 9, 2018.

FIELD OF THE DISCLOSURE

This description relates to methods and devices for transmitting a message coded in the form of light, in particular for the purpose of verifying the display of content by an electronic screen.

More particularly, the description relates to a method for transmitting a coded light message, comprising a step of the coded message being emitted by a light-emitting device and a step of the coded message being received by a light sensor.

BACKGROUND OF THE DISCLOSURE

Document WO03052734 describes a method of transmitting a coded message via an electronic screen, in order to verify the content displayed by the screen. The message is representative of the content displayed. The message is coded in binary as a sequence of bits represented by two levels of light intensity. The bits of the coded message are displayed at a predetermined rate, within a coding region composed of a small set of pixels of the screen. A light sensor, arranged in correspondence with the coding region, measures the light levels in this coding region in sync with the time frame of the emitted signal.

SUMMARY OF THE DISCLOSURE

Methods of this type imply perfect synchronization between the emission of the signal and the measurement; otherwise the reading of the coded message may be incorrect.

The present description has the particular aim of overcoming this disadvantage.

To this end, a method is proposed for transmitting a coded light message, comprising:
- a step of the coded message being emitted by a light-emitting device capable of emitting a plurality of colors, the coded message being emitted in the form of a series of colors emitted by the light-emitting device during regular consecutive time intervals, said message being coded by transitions between different colors emitted over said consecutive time intervals, each transition between two consecutive predetermined colors representing a predetermined information item and said colors being chosen among N predetermined colors;
- a step of the coded message being received by a light sensor controlled to capture the colors emitted by the light emitter during consecutive time intervals and thus to determine the color transitions between consecutive time intervals, representative of the coded message.

With these arrangements, very low-cost, very inexpensive color sensors can be used for receiving the coded message, since there is only one color variation to be read.

In addition, the use of the transition between two colors and not of the absolute color eliminates the need for perfect synchronization between the display frequency and the sensor capture frequency. This asynchronous process also contributes to allowing the use of a low-cost, miniaturized device for receiving the light signal.

In various embodiments of the transmission method, one or more of the following arrangements may possibly be used:
- the respective information items represented by the transitions between two predetermined consecutive colors are binary codes;
- said binary codes are coded in 2 bits;
- said predetermined information items transmissible by the method are P in number, P being an integer less than N, and each of said predetermined information items can be represented by P different transitions between first and second colors, these P transitions respectively comprising P different first colors: in this manner, the coding of the information by the color transitions is very fast, since each information item is codable at all times, regardless of the color which has just been emitted by the light-emitting device;
- the number N of predetermined colors is equal to 6;
- the light sensor is chosen among a camera and a color sensor;
- the light-emitting device comprises a coding region that is part of a display surface of an electronic screen;
- the coding region comprises between 1 and 64 pixels;
- the light sensor is fixed on the display surface of the screen so as to completely cover the coding region;
- the screen is controlled by a local central control unit to show a content and the transmitted coded message is representative of said content;
- the content is displayed on a central portion of the screen display surface with the exception of a margin, and the coding region is included in said margin;
- the local central control unit receives the content from a server and said coded message is created by the server according to the content;
- the light sensor is associated with a central decoding unit which is capable of receiving signals from the light sensor that are indicative of the colors captured by said light sensor, and of determining the predetermined information items represented by the color transitions emitted by the light emitter;
- the decoded information items determined by the central decoding unit are transmitted to a centralized verification unit.

The present description also relates to a device for transmitting a coded light message, comprising:
- a local central control unit;
- a light-emitting device capable of emitting a plurality of colors and controlled by the local central control unit to emit the coded message in the form of a series of colors emitted during regular consecutive time intervals, said message being coded by transitions between different colors emitted over consecutive time intervals, each transition between two consecutive predetermined colors representing a predetermined information item and said colors being chosen among N predetermined colors;
- a central decoding unit;

a light sensor connected to the central decoding unit in order to capture the colors emitted by the light emitter during consecutive time intervals, the central decoding unit being capable of determining the color transitions between consecutive time intervals, representative of the coded message.

In various embodiments of the transmission device, one or more of the following arrangements may possibly be used:

the respective information items represented by the transitions between two consecutive predetermined colors, are binary codes;

said binary codes are coded in 2 bits;

said predetermined information items transmissible by the method are P in number, P being an integer less than N, and each of said predetermined information items can be represented by P different transitions between first and second colors, these P transitions respectively comprising P different first colors;

the number N of predetermined colors is equal to 6;

the light sensor is chosen among a camera and a color sensor;

the light-emitting device comprises a coding region that is part of a display surface of an electronic screen;

the coding region comprises between 1 and 64 pixels;

the light sensor is fixed on the display surface of the screen so as to completely cover the coding region;

the screen is controlled by the local central control unit to show a content and the transmitted coded message is representative of said content;

the content is displayed on a central portion of the screen display surface with the exception of a margin, and the coding region is included in said margin;

the device further comprises a server which is capable of transmitting the content to the local central control unit and said server is capable of creating the coded message according to the content;

the device further comprises a centralized verification unit and the central decoding unit is capable of transmitting said decoded information items to said centralized verification unit.

BRIEF DESCRIPTION OF DRAWINGS

Other features and advantages will be apparent from the following description of one of its embodiments, given as a non-limiting example, with reference to the accompanying drawings.

In the drawings.

DETAILED DESCRIPTION OF THE DISCLOSURE

In the different figures, the same references designate identical or similar elements.

Figure 1:
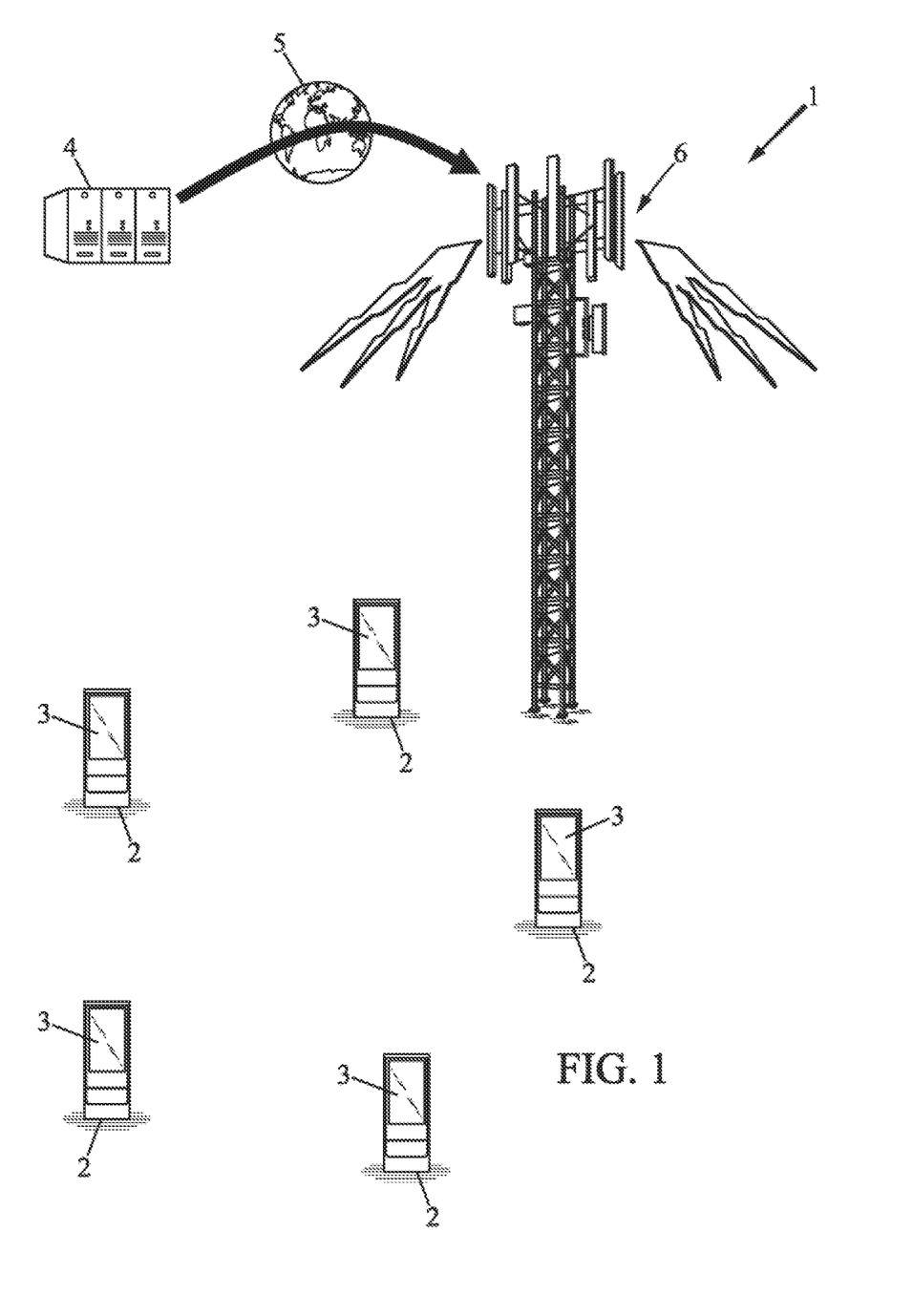
FIG. 1 is a partial schematic view of a network for broadcasting digital content, able to implement the method for transmitting coded light messages.

FIG. 1 shows a network 1 for broadcasting digital content, comprising a plurality of digital display devices 2 which each comprise a digital screen 3. The digital content in question may in particular include videos and still images, but also interactive games or other content.

This digital content may be transmitted to the digital display devices 2 from at least one remote server 4, via any wide area network ("WAN"), in particular by the Internet 5. The wide area network may possibly include one or more radio links 6 (for example using the LTE standard or other) to some or all of the digital display devices 2.

The digital display devices 2 may be arranged in particular in public places, in other words all places accessible to the public such as public thoroughfares, train and bus stations, airports, shopping centers, etc.

Figure 2:
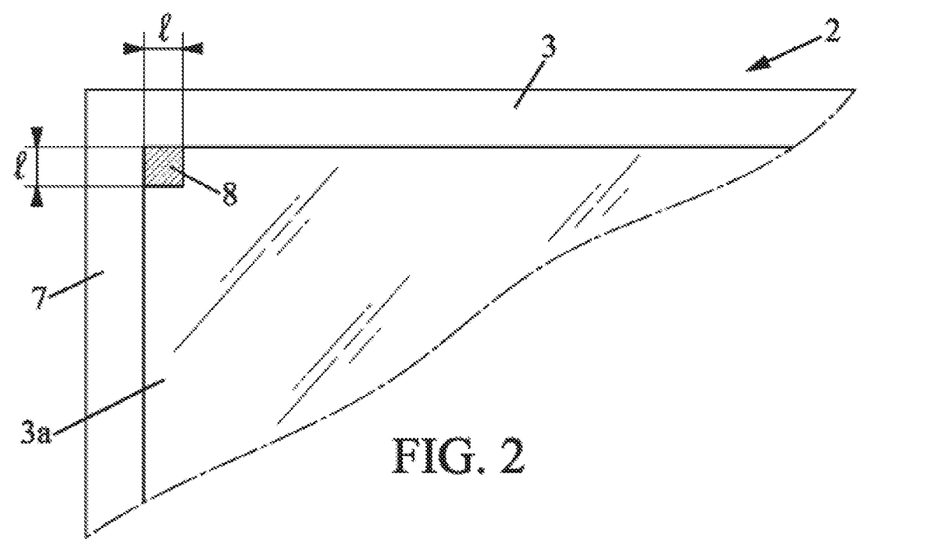
FIG. 2 is a partial front view of an electronic screen that is part of the network of FIG. 1.
Figure 3:
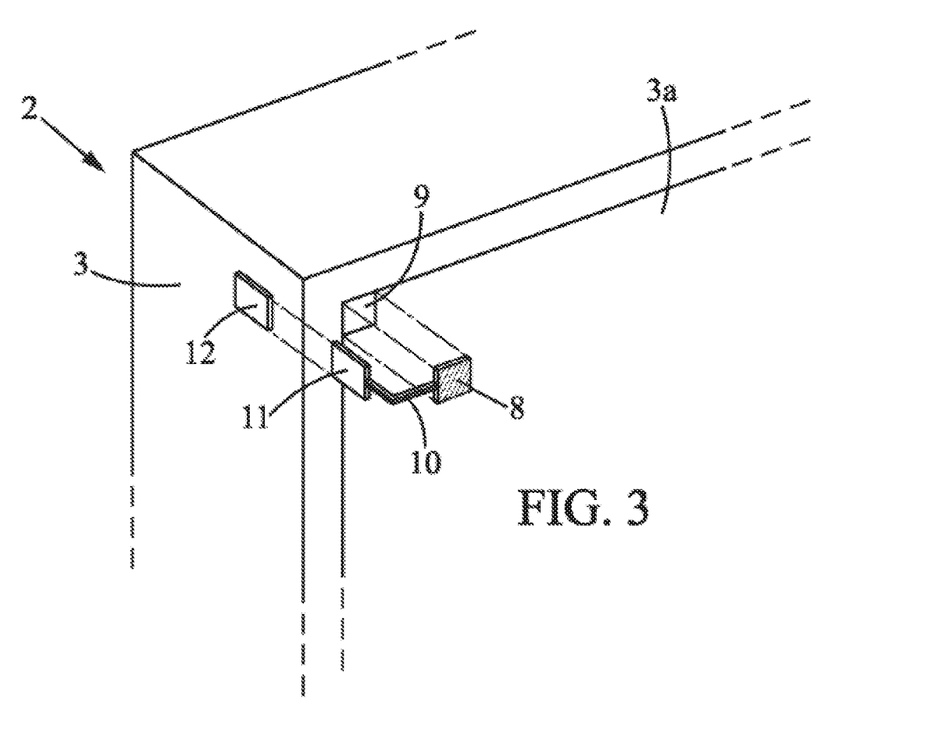
FIG. 3 is a schematic exploded view of a portion of the electronic screen of FIG. 2.
Figure 4:
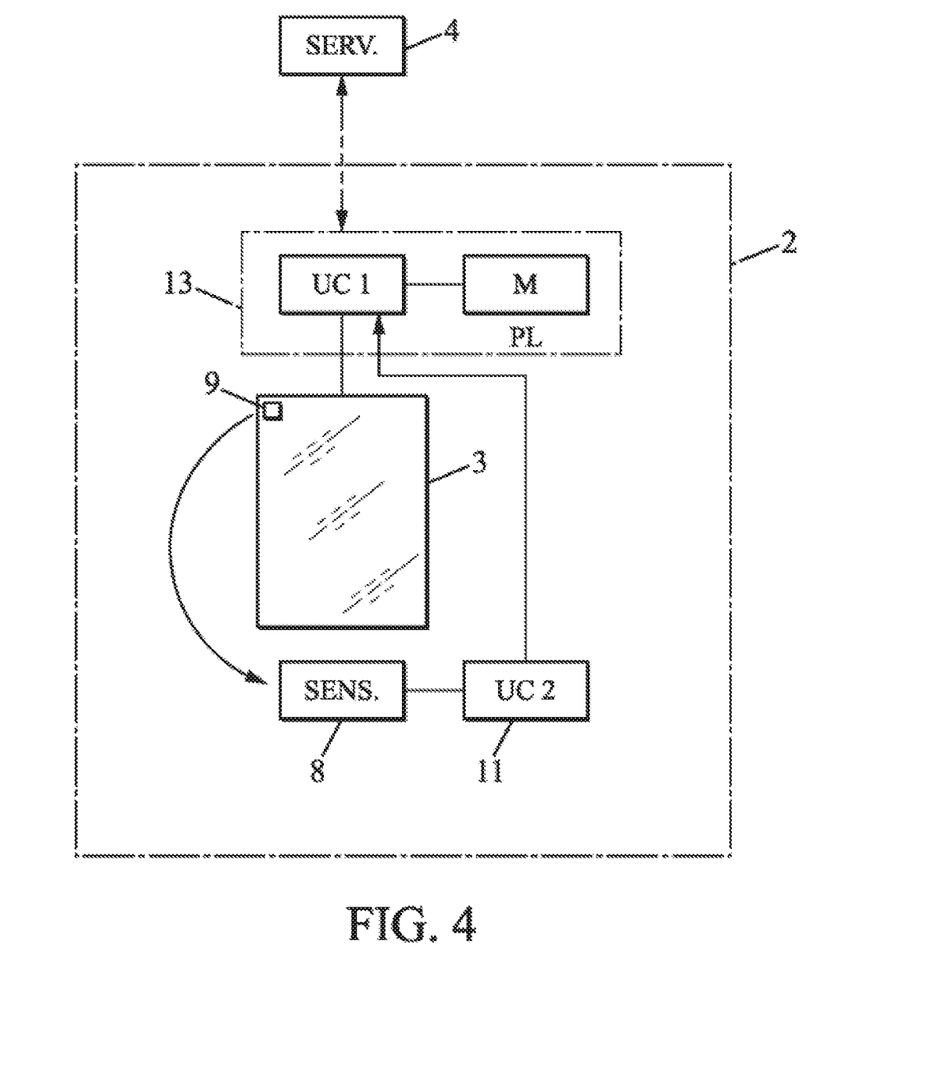
FIG. 4 is a block diagram illustrating the main parts of the electronic screen of FIGS. 2 and 3 and the communication of this screen with a central server.

As represented in FIGS. 2 to 4, the screen 3 of each electronic display device 2 may include a display surface 3a in the center of a frame 7. A portion of the display surface 3a, preferably at or near the frame 7, may form a coding region 9 covered by a light sensor 8 (SENS).

The coding region 9 is capable of transmitting coded light messages. The coding region 9 may consist of a single pixel of the display surface 3a, or where appropriate 2*2 pixels or 3*3 pixels. More generally, the coding region can represent between 1 and 64 pixels.

The light sensor 8 may be fixed directly to the display surface 3a, preferably so as to completely cover the coding region 9.

The light sensor 8 may be a miniature camera or a color sensor.

When the light sensor is a color sensor, it is particularly inexpensive and compact. For example, the measurement area of the color sensor can have dimensions of 1*1 which may be, for example, on the order of 2 mm*2 mm. The total dimensions of the color sensor (with its PCB) may be less than 20 mm*20 mm. An example of a usable color sensor is the "SparkFun RGB Light Sensor—ISL29125".

The light sensor 8 may be connected to an electronic decoding unit 11 (UC2), for example by a cable 10. An example of a usable electronic decoding unit 11 is the "Raspberry Pi Zero W" circuit board. The electronic decoding unit 11 can communicate with the central control unit 13 (or "player" PL, comprising in particular a processor UC1 and mass memory M) of the electronic display device 2 by radio or wire, for example via a USB connector 12 or some other type of connector. Alternatively, the electronic decoding unit 11 could communicate directly with the outside, for example with a remote server (server 4 or other), by radio (for example using Bluetooth® or WiFi) and via the Internet.

The central control unit 13 communicates with the remote server 4, particularly in order to receive content to be presented on the screen 3.

Figure 5:
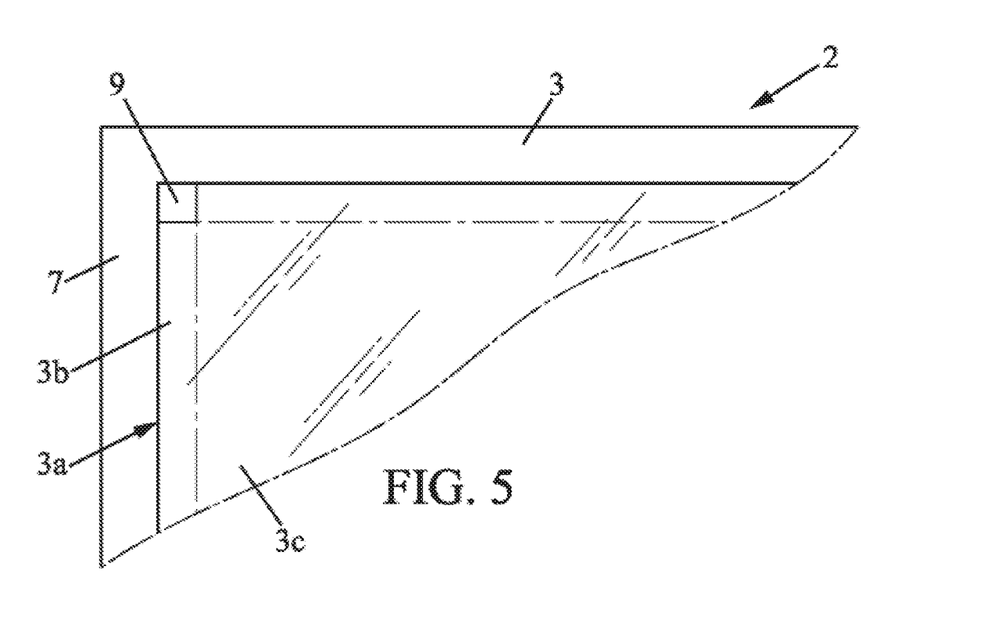
FIG. 5 is a partial front view of the screen of FIGS. 2 to 4.

As shown in FIG. 5, the content may if necessary be presented on a central portion 3c of the display surface 3a, leaving a margin 3b free. The coding region 9 may be arranged within the margin 3b, so as not to interfere with the content displayed by the screen 3.

Figure 6:
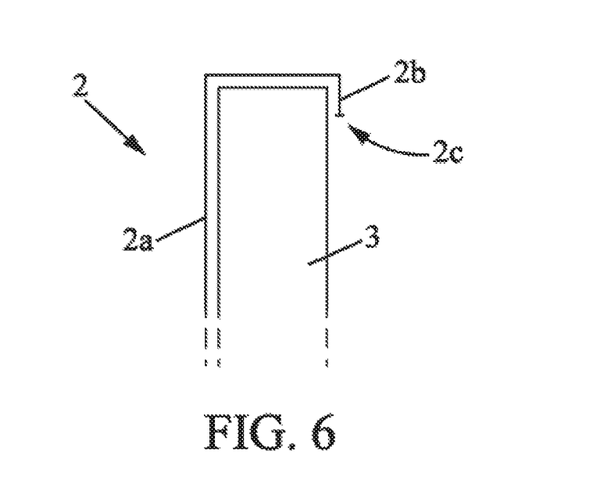
FIG. 6 is a sectional view illustrating a variant of the screen of FIGS. 2 to 5.

As shown in FIG. 6, the electronic display device 2 may comprise a housing 2a which forms a flange 2b on the front face of the electronic display panel 3, defining a window 2c which leaves visible at least the above-mentioned central portion 3c of the display surface 3a. The coding region 9 and the light sensor 8 may where appropriate be hidden by the flange 2b.

The coding region 9 is used to transmit a coded light message to the light sensor 8, according to a particular coding mode which will be explained in more detail below. More generally, this coding mode could be used to transmit a coded light message between any other light-emitting device and a light sensor. All the explanations given herein with the coding region 9 can therefore be transposed to another light-emitting device.

The coded light message is emitted by the coding region 9, as controlled by the central control unit 13, in the form of a series of colors chosen among N predetermined colors (the screen 3 is a color screen) emitted during regular consecutive time intervals. The light message is coded by transitions between different colors emitted over equal consecutive time intervals T, each transition between two consecutive predetermined colors representing a predetermined information item.

N may be for example equal to 6, the predetermined colors being for example red, green, blue, cyan, yellow, magenta.

Said predetermined information items transmissible by the method may be P in number, P being an integer less than N, and each of said predetermined information items can be represented by P different transitions between first and second colors, these P transitions respectively comprising P different first colors. Thus, whatever the color being displayed by the coding region 9, the following color can be chosen so that the transition between the two colors is representative of a desired information item among the P predetermined information items.

Advantageously, the respective information items represented by the transitions between two predetermined consecutive colors are binary codes. For example, said binary codes are coded in 2 bits, in which case P=4. In this case, when one of the N=6 colors is being displayed, the transitions to 4 of the 5 other colors are used to represent 4 information items coded in 2 bits each, and one of the transitions remains unused. The table below gives the 2-bit codes (00, 01, 10, 11) represented by the color transitions in one exemplary embodiment (the first color is indicated in the first column, the second color is indicated in the first row, XX denotes prohibited transitions with no color change, and YY denotes unused transitions):

|         | Red | Yellow | Green | Cyan | Blue | Magenta |
|---------|-----|--------|-------|------|------|---------|
| Red     | XX  | 00     | 01    | 10   | 11   | YY      |
| Yellow  | YY  | XX     | 00    | 01   | 10   | 11      |
| Green   | 11  | YY     | XX    | 00   | 01   | 10      |
| Cyan    | 10  | 11     | YY    | XX   | 00   | 01      |
| Blue    | 01  | 10     | 11    | YY   | XX   | 00      |
| Magenta | 00  | 01     | 10    | 11   | YY   | XX      |

Figure 7:
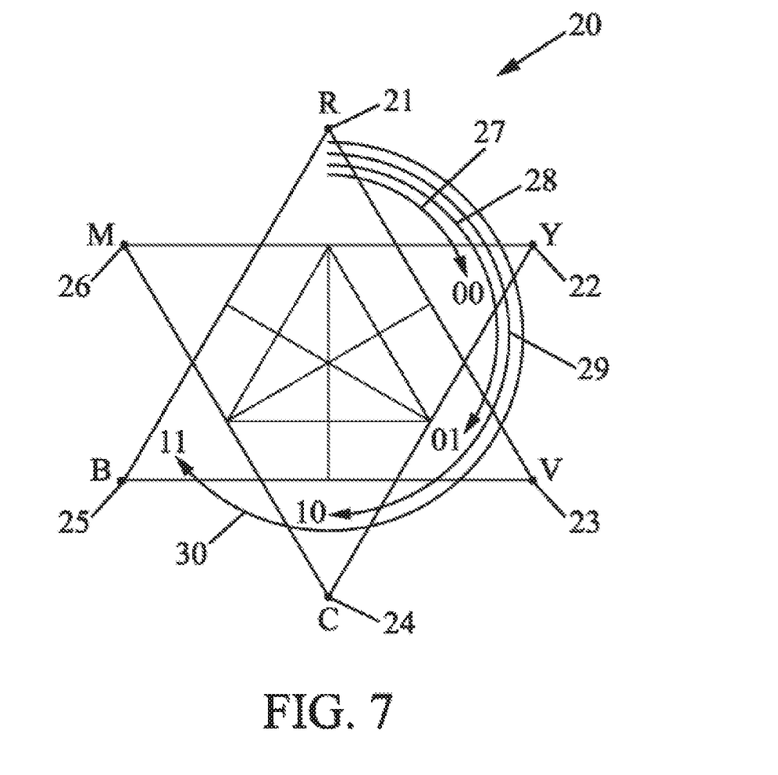
FIG. 7 illustrates the coding of information by color transitions, usable in the screen of FIGS. 2 to 6.

FIG. 7 illustrates the color transitions corresponding to the first row of the above table in the RGB color diagram, starting from red R 21 ([RGB coordinates [255, 0, 0]):

a transition to yellow Y 22 ([RGB coordinates [255, 255, 0]) according to arrow 27 corresponds to the 2-bit code 00;

a transition to green V 23 ([RGB coordinates [0, 255, 0]) according to arrow 28 corresponds to the 2-bit code 01;

a transition to cyan C 24 ([RGB coordinates [0, 255, 255]) according to arrow 29 corresponds to the 2-bit code 10;

a transition to blue B 25 ([RGB coordinates [0, 0, 255]) according to arrow 30 corresponds to the 2-bit code 11.

There is no transition from red to magenta 26 ([RGB coordinates [255, 0, 255]).

The coded messages formed by the color transitions emitted by the coding region 9 are captured by the light sensor 8 and decoded by the central decoding unit 11. This decoding is carried out very reliably even with inexpensive electronics, in particular because there is no need for perfect synchronization between the emission and reception of coded messages, due to the use of color transitions and not absolute colors (in the case of the use of absolute colors, the same color may be emitted during several consecutive emission periods, so it is necessary to pinpoint the beginning of each period very precisely in time in order to count the number of periods concerned).

This mode of transmitting information by optical coded message between a light-emitting device and a light sensor can be used in general to transmit information optically.

A particularly useful application of this mode of transmission relates to verifying that the content received from the server 4 is indeed displayed by the digital display devices 2.

To this end, the server 4 or another server may generate coded messages associated with the various content and send them to the central control unit 13 of each digital display device 2 at the same time as the content. More particularly, the optical coded messages can be integrated into the content by the server 4 or another server.

Figure 8:
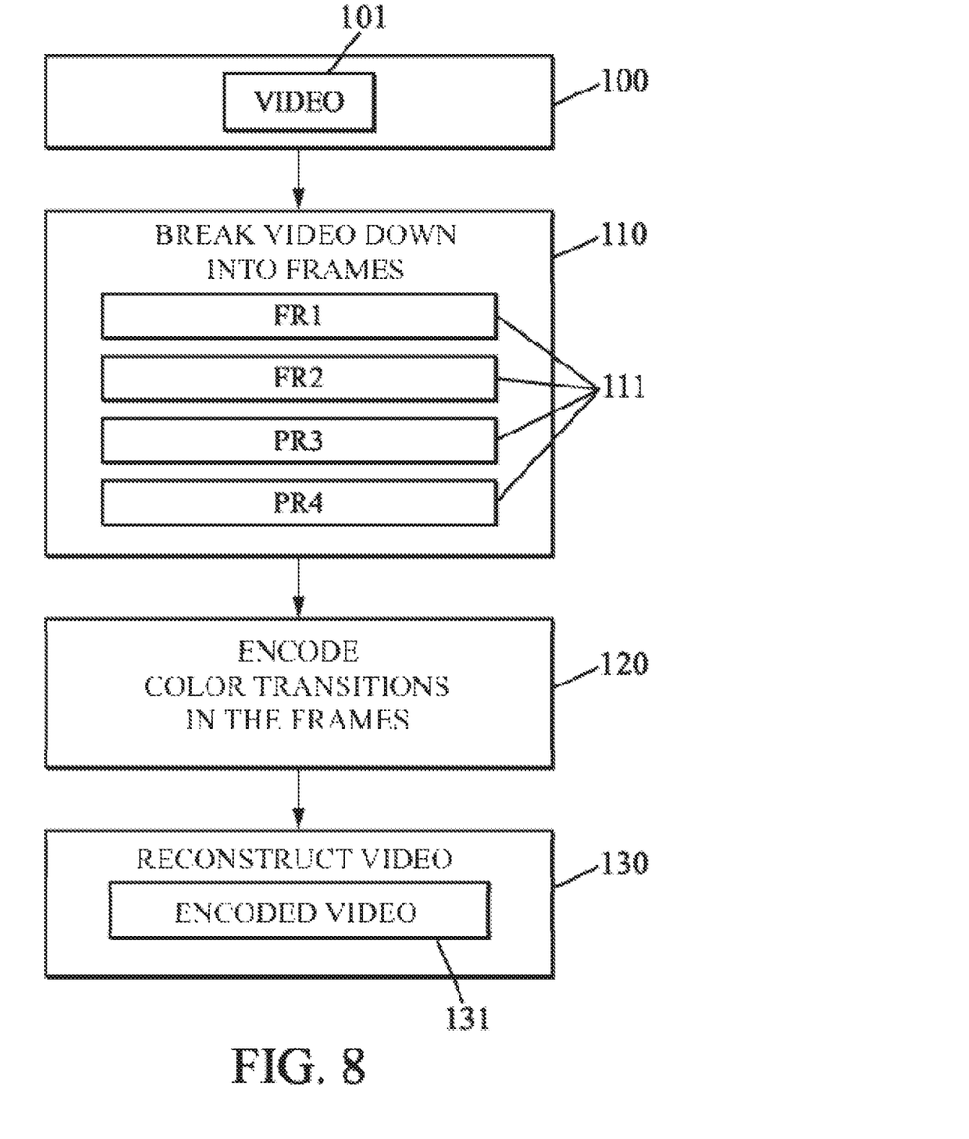
FIG. 8 illustrates a method for encoding a video in order to make use of the method for transmitting coded light messages.

For example, as illustrated in FIG. 8, when the content is a video 101, the server 4 or another server can follow the following process:

the video 101 is loaded by the server in step 100;

in step 110, the video 101 is broken down into consecutive frames 111 (FR1-FR4 in this example, the number of frames obviously not being limited to 4);

in step 120, the color transitions of the coding region 109 are encoded in the frames 111;

in step 130, the encoded video 131 is reconstructed.

Figure 10:
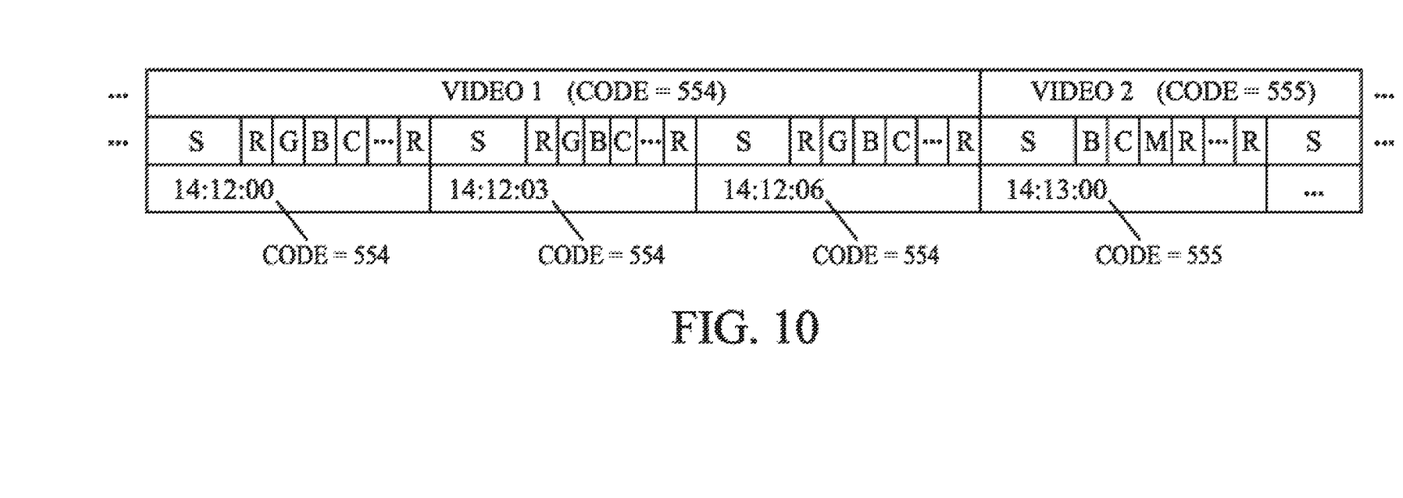
FIG. 10 illustrates a stream of encoded videos as obtained by implementing the method of FIG. 8.

Each optical coded message may optionally be repeated in the encoded video 131 to avoid read errors, for example three times as represented in FIG. 10. In addition to the color transitions which are each representative of a code, for example 2 bits as previously explained (the colors are symbolized by R (red), G (green), B (blue), C (cyan), Y (yellow), M (magenta) in FIG. 10), each optical coded message can start with an initialization sequence S (for example a display of alternating black and white over several consecutive periods T). Each coded message can represent an identifier of the video 101 (554, 555, etc. in the example of FIG. 10).

Figure 9:
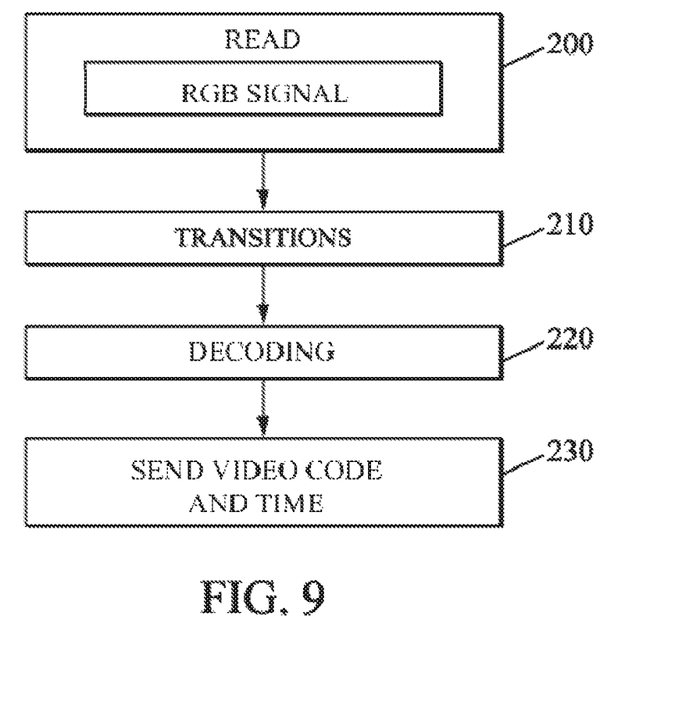
FIG. 9 illustrates the decoding of the coded light message.

When the contents are displayed by the screen 3, the optical coded message is emitted by the coding region 9 of the screen and received by the light sensor 8. The central decoding unit 11 then decodes the optical coded message. As illustrated in FIG. 9:

in step 200, the optical coded message is read by the sensor 8 (which captures an RGB signal);

in step 210, the central decoding unit 11 identifies the color transitions;

in step 220, the central decoding unit 11 decodes the message and reconstructs the aforementioned identifiers (554, 555, etc.) and stores the times of the readings in order to timestamp these identifiers (see also FIG. 10);

in step 230, the central decoding unit 11 sends the identifiers of the timestamped videos to the central control unit 13, which sends the information on to the server 4 or to any other centralized verification unit. Instead of sending the information to the central control unit 13, the central decoding unit 11 sends the identifiers of the timestamped videos to a controller board for the screen 3, which in turn sends the information to the server 4 or to any other centralized verification unit. In another variant, the central decoding unit 11 can send this information directly to the server 4 or to any other centralized verification unit, as explained above.

The server 4, or other centralized verification unit, thus collects proof that each content has indeed been displayed by the screen 3.

The invention claimed is:

1. A method for transmitting a coded light message, the method comprising:
    a step of the coded message being emitted by a light-emitting device capable of emitting a plurality of colors, the coded message being emitted in the form of a series of colors emitted by the light-emitting device during regular consecutive time intervals, said message being coded by transitions between different colors emitted over consecutive time intervals, each transition between two consecutive predetermined colors representing a predetermined information item and said colors being chosen among N predetermined colors;
    a step of the coded message being received by a light sensor controlled to capture the colors emitted by the light emitter during consecutive time intervals and thus to determine the color transitions between consecutive time intervals, representative of the coded message,
    wherein the light-emitting device comprises a coding region that is part of a display surface of an electronic screen.

2. The method according to claim 1, wherein the respective information items represented by the transitions between two predetermined consecutive colors are binary codes.

3. The method according to claim 2, wherein said binary codes are coded in 2 bits.

4. The method according to claim 1, wherein said predetermined information items transmissible by the method are P in number, P being an integer less than N, and each of said predetermined information items can be represented by P different transitions between first and second colors, these P transitions respectively comprising P different first colors.

5. The method according to claim 1, wherein the number N of predetermined colors is equal to 6.

6. The method according to claim 1, wherein the light sensor is chosen among a camera and a color sensor.

7. The method according to claim 1, wherein the coding region comprises between 1 and 64 pixels.

8. The method according to claim 1, wherein the light sensor is fixed on the display surface of the screen so as to completely cover the coding region.

9. The method according to claim 1, wherein the screen is controlled by a local central control unit to show a content and the transmitted coded message is representative of said content.

10. The method according to claim 9, wherein the content is displayed on a central portion of the display surface of the screen with the exception of a margin, and the coding region is included in said margin.

11. The method according to claim 9, wherein the local central control unit receives the content from a server and said coded message is created by the server according to the content.

12. A method for transmitting a coded light message, the method comprising:
    a step of the coded message being emitted by a light-emitting device capable of emitting a plurality of colors, the coded message being emitted in the form of a series of colors emitted by the light-emitting device during regular consecutive time intervals, said message being coded by transitions between different colors emitted over consecutive time intervals, each transition between two consecutive predetermined colors representing a predetermined information item and said colors being chosen among N predetermined colors;
    a step of the coded message being received by a light sensor controlled to capture the colors emitted by the light emitter during consecutive time intervals and thus to determine the color transitions between consecutive time intervals, representative of the coded message,
    wherein the light sensor is associated with a central decoding unit which is capable of receiving signals from the light sensor that are indicative of the colors captured by said light sensor, and of determining the predetermined information items represented by the color transitions emitted by the coding region.

13. The method according to claim 12, wherein the decoded information items determined by the central decoding unit are transmitted to a centralized verification unit.

14. A device for transmitting a coded light message, the device comprising:
    a local central control unit;
    a light-emitting device capable of emitting a plurality of colors and controlled by the local central control unit to emit the coded message in the form of a series of colors emitted during regular consecutive time intervals, said message being coded by transitions between different colors emitted over said consecutive time intervals, each transition between two consecutive predetermined colors representing a predetermined information item and said colors being chosen among N predetermined colors;
    a central decoding unit;
    a light sensor connected to the central decoding unit in order to capture the colors emitted by the light emitter during consecutive time intervals, the central decoding unit being capable of determining the color transitions between consecutive time intervals, representative of the coded message,
    wherein the light-emitting device comprises a coding region that is part of a display surface of an electronic screen.

15. The device according to claim 14, wherein the coding region comprises between 1 and 64 pixels.

16. The device according to claim 14, wherein the light sensor is fixed on the display surface of the screen so as to completely cover the coding region.

17. The device according to claims 14, wherein the screen is controlled by the local central control unit to show a content and the transmitted coded message is representative of said content.

18. The device according to claim 17, wherein the content is displayed on a central portion of the display surface of the screen with the exception of a margin, and the coding region is included in said margin.

19. The device according to claims 17, further comprising a server which is capable of transmitting the content to the local central control unit and said server is capable of creating the coded message according to the content.

20. The device according to claim 14, further comprising a centralized verification unit, and the central decoding unit is capable of transmitting said decoded information items to said centralized verification unit.

\* \* \* \* \*